United States Patent
Boscher et al.

(10) Patent No.: US 8,682,951 B2
(45) Date of Patent: Mar. 25, 2014

(54) METHOD FOR PROCESSING DATA INVOLVING MODULAR EXPONENTIATION AND RELATED DEVICE

(75) Inventors: Arnaud Boscher, Puteaux (FR); Christophe Giraud, Pessac (FR); Robert Naciri, Chatenay Malabry (FR)

(73) Assignee: Oberthur Technologies, Colombes (FR)

( * ) Notice: Subject to any disclaimer, the term of this patent is extended or adjusted under 35 U.S.C. 154(b) by 1249 days.

(21) Appl. No.: 11/887,632

(22) PCT Filed: Mar. 27, 2006

(86) PCT No.: PCT/FR2006/000662
§ 371 (c)(1),
(2), (4) Date: Oct. 25, 2007

(87) PCT Pub. No.: WO2006/103341
PCT Pub. Date: Oct. 5, 2006

(65) Prior Publication Data
US 2009/0240756 A1     Sep. 24, 2009

(30) Foreign Application Priority Data
Mar. 30, 2005   (FR) ..................... 05 03083

(51) Int. Cl.
*G06F 7/38*     (2006.01)
(52) U.S. Cl.
USPC .......................... 708/491; 200/490
(58) Field of Classification Search
None
See application file for complete search history.

(56) References Cited

U.S. PATENT DOCUMENTS

| | | | |
|---|---|---|---|
| 5,991,415 A | 11/1999 | Shamir et al. | |
| 6,298,442 B1 | 10/2001 | Kocher et al. | |
| 6,381,699 B2 | 4/2002 | Kocher et al. | |
| 6,748,410 B1 * | 6/2004 | Gressel et al. | 708/491 |
| 7,123,717 B1 * | 10/2006 | Coron et al. | 380/28 |
| 2004/0148325 A1 * | 7/2004 | Endo et al. | 708/492 |

FOREIGN PATENT DOCUMENTS

| | | |
|---|---|---|
| WO | 98/52319 | 11/1998 |
| WO | 03/014916 | 2/2003 |

OTHER PUBLICATIONS

"A Countermeasure Against One Physical Cryptanalysis May Benefit Another Attack," Sung-Ming Yen et al., Information Security and Cryptology-ICISC 2001. $4^{th}$ International Conference Proceedings, Dec. 2001, vol. 2288, 2000, pp. 414-427, XP002364934.
"A CRT-Based RSA SystemResistant to Physical Cryptanalysis," CK Kim et al., Forum 2004, ITRC.OR.KR, 2004, pp. 1-9, XP002364935.
C. Aumuller et al., "Fault attacks on RSA with CRT: Concrete Results and Practical Countermeasures", in B.S. Kaliski Jr., O.K. Kog, and C. Paar, editors, Cryptographic Hardware and Embedded Systems—CHES 2002, vol. 2523 of Lecture Notes in Computer Science, pp. 260-275 (1-18). Springer-Verlag, 2002.

(Continued)

*Primary Examiner* — Michael D Yaary
(74) *Attorney, Agent, or Firm* — Young & Thompson

(57) ABSTRACT

A data processing method, whereby an element is subjected to a first operation with a given operand. The method includes a step of updating by a second operation a first variable (B; $a_0$; $S'_p$, $S'_q$) or a second variable (A; $a_1$; $S_p$, $S_q$), depending on whether a corresponding bit of the operand=0 or 1; and a step of testing a relationship between a first value (B; $a_0$; S') derived from the first variable and a second value (A; $a_1$; S) derived from the second variable. A related device is also disclosed.

20 Claims, 3 Drawing Sheets

(56) References Cited

OTHER PUBLICATIONS

F. Bao et al., "Breaking Public Key Cryptosystems on Tamper Resistant Devices in the Presence of Transient Faults", in 5th Security Protocols WorkShop, vol. 1361 of Lecture Notes in Computer Science, pp. 115-124. Springer-Verlag, 1997.

H. Bar-El et al., "The Sorcerer's Apprentice Guide to Fault Attacks", in L. Breveglieri and 1. Koren, editors, Workshop on Fault Diagnosis and Tolerance in Cryptography—FDTC'04, pp. 330-342 (1-13). IEEE Computer Society, 2004.

E. Biham et al., "Differential Fault Analysis of Secret Key Cryptosystems", in B.S. Kalisky Jr., editor, Advances in Cryptology—CRYPTO '91, vol. 1294 of Lecture Notes in Computer Science, pp. 513-525 (1-13). Springer-Verlag, 1997.

J. Blomer et al., "A New CRT-RSA Algorithm Secure Against Bellcore Attacks", in S. Jajodia, V. Atluri, and T. Jaeger, editors, ACM Conference on Computer and Communications Security—CCS'03, pp. 311-320. ACM Press, 2003.

D. Boneh et al., "On the Importance of Checking Cryptographic Protocols for Faults", in W. Fumy, editor, Advances in Cryptology—EUROCRYPT '97, vol. 1233 of Lecture Notes in Computer Science, pp. 37-51. Springer-Verlag, 1997.

C. Couvreur et al., "Fast decipherment algorithm for RSA public-key cryptosystem", Electronics Letters, 18 (21):905-907, 1982.

C. Giraud et al., "Fault Attacks on Signature Schemes", in H. Wang, J. Pieprzyk, and V. Varadharajan, editors, Information Security and Privacy—9th Australasian Conference—ACISP 2004, vol. 3108 of Lecture Notes in Computer Science, pp. 478-491 (1-15). Springer-Verlag, 2004.

C. Giraud et al., "A Survey on Fault Attacks", in J.-J. Quisquater, P. Paradinas, Y. Deswarte, and A.A. El Kalam, editors, Smart Card Research and Advanced Applications VI—CARDIS 2004, pp. 159-176. Kluwer Academic Publishers, 2004.

M. Joye et al., "The Montgomery Powering Ladder", in B.S. Kaliski Jr., Q.K. Koc, and C. Paar, editors, Cryptographic Hardware and Embedded Systems—CHES 2002, vol. 2523 of Lecture Notes in Computer Science, pp. 291-302. Springer-Verlag, 2002.

P. Kocher, "Timing Attacks on Implementations of Diffie-Hellman, RSA, DSS, and Other Systems", in N. Koblitz, editor, Advances in Cryptology—CRYPTO '96, vol. 1109 of Lecture Notes in Computer Science, pp. 104-113. Springer-Verlag, 1996.

A.K. Lenstra, "Memo on RSA Signature Generation in the Presence of Faults", Manuscript, 1996. Available from the author at akl@Lucent.com.

G. Piret et al., "A Differential Fault Attack Technique against SPN Structures, with Application to the AES and KHAZAD", in C.D. Walter, C.K. Koc, and C. Paar, editors, Cryptographic Hardware and Embedded Systems—CHES 2003, vol. 2779 of Lecture Notes in Computer Science, pp. 77-88. SpringerVerlag, 2003.

R. L. Rivest et al., "A Method for Obtaining Digital Signatures and Public-Key Cryptosystems", Comm. ACM, 21 (2):120-126 (1-15), 1978.

D. Wagner, "Cryptanalysis of a Provably Secure CRT-RSA Algorithm", in B. Pfitzmann and P. Liu, editors, ACM Conference on Computer and Communications Security—CCS'04, pp. 82-91. ACM Press, 2004.

S.-M. Yen et al., "Checking Before Output May Not Be Enough Against Fault-Based Cryptanalysis", IEEE Transactions on Computers, 49(9):967-970 (1-10), 2000.

S.-M. Yen et al., "RSA Speedup with Chinese Remainder Theorem Immune against Hardware Fault Cryptanalysis", IEEE Transactions on Computers, vol. 52, No. 4, Apr. 2003, pp. 461-472.

A. Menezes et al., "Handbook of Applied Cryptography", chapter 14, pp. 613-630, 1997 by CRC Press, Inc.

Peter L. Montgomery, "Modular Multiplication Without Trial Division", Mathematics of Computation, Apr. 1985, pp. 519-521, vol. 44, No. 170, American Mathematical Society.

D. Knuth; The Art of Computer Programming, vol. 2, Seminumerical Algorithms, 1969, pp. 248-250.

\* cited by examiner

METHOD FOR PROCESSING DATA INVOLVING MODULAR EXPONENTIATION AND RELATED DEVICE

BACKGROUND OF THE INVENTION

1. Field of the Invention

The invention concerns a method for processing data involving modular exponentiation, and a related device.

2. Description of the Related Art

Modular exponentiation calculations are often used in cryptographic algorithms and in this context generally introduce a secret, that is to say a number stored by the device that uses the cryptographic algorithm and that is not accessible from the exterior.

The steps that implement the modular exponentiation are particularly subject to attacks by malicious persons; these may be error generation attacks (in particular of the DFA (Differential Fault Analysis) type) or attacks by analysis of the current consumption of the device that uses the algorithm (of the SPA (Statistical Power Analysis) or DPA (Differential Power Analysis) type).

Attempts have therefore been made to protect these steps, in particular in the case where the secret to be protected corresponds to the exponent used in the modular exponentiation.

Thus if a "square-and-multiply" type algorithm is used in which a variable is updated by multiplication for each bit of the exponent having the value 1 (and for those bits only), attempts have been made to render the process symmetrical, for example by effecting a snare multiplication if the bit of the exponent has the value 0, with the aim of countering attacks by measurement of current (sometimes called SPA attacks) or by measurement of time ("timing attacks").

Starting from this general idea, various algorithms protected against SPA type attacks have been developed, such as that described in the paper "The Montgomery Powering Ladder", B. S. Kaliski Jr., C. Q. Koc and C. Paar, "Cryptographic Hardware and Embedded Systems"—CHES 2002, pages 291-302.

Attempts have also been made to protect cryptographic algorithms, including those using modular exponentiation, from error generation attacks, by means of which an attacker attempts to deduce information on the internal operation of the device that uses the cryptographic method by generating a malfunction within that process.

One solution widely used to combat this latter type of attack consists in duplicating the calculations effected in order to verify that both iterations of the same calculation give the same result, which generally tends to prove that no error has occurred during their execution. However, this solution entails doubling the calculation time for each operation to be protected (not to mention the necessary subsequent verification step), which is naturally not desirable.

To remedy this problem, patent application WO 98/52319 proposes, when the Chinese Remainder Theorem (CRT) is used, to exploit the assumed identity of two values each obtained from one of the branches of the algorithm using this theorem to verify the a priori error-free execution of the algorithm in its two branches.

This solution, which exploits a particular feature of applications using the Chinese Remainder Theorem, is not applicable to other types of implementation, however. It should further be mentioned on this subject that using the Chinese Remainder Theorem involves knowing the decomposition into prime numbers p, q of the public module n=p·q.

Finally, this solution effects a verification by means of data employed at an intermediate stage of the process, and therefore cannot verify error-free operation at all points of the process, as the designer might wish: for example, this technique cannot protect the process in the case of error generation attacks upon recombination of the result obtained by each of the branches of the algorithm.

SUMMARY OF THE INVENTION

In order to improve upon this state of affairs, and therefore to propose a method of processing data involving modular exponentiation protected both against current analysis attacks and error generation attacks, the invention proposes a method for processing data (generally a cryptographic method) in which an element (such as a message) is subjected to a first operation with a given operand (for example a secret key), including a step of updating by a second operation either a first variable or a second variable, depending on whether a corresponding bit of the operand has the value 0 or 1, characterized by a step of testing a relationship between a first value derived from the first variable and a second value derived from the second variable.

Because the first and second variables are updated in a complementary manner, there exists a relationship between the two variables, or between the values derived from them, that should normally be satisfied. Non-verification of the test therefore indicates an error during the calculation and therefore enables an attack to be detected, even if the attack is directed against a snare operation (case of "safe error" attacks).

The first and second values are those of the first and second variables, respectively, for example; in this case, the first and second variables can themselves be used for the test, which in particular involves a saving in memory.

The first operation is a modular exponentiation, for example, in which case the second operation is a modular multiplication and the operand is an exponent.

The test step can then include comparing the product of the first and second variables to a third variable updated regardless of the value of the corresponding bit of the operand.

An alternative test step includes comparing the first variable to the product of the element and the second variable.

In another possible embodiment, the first operation is a multiplication on an elliptical curve and the second operation is an addition on the elliptical curve.

The relationship can be independent of the operand, which simplifies the test step.

The verification step can in particular be applied to the result of the first operation, that is to say after the calculation steps involving the second operation.

The method can equally include a step of verifying the relationship for each bit of the operand. This detects any error generation attack as soon as it has interfered with a calculation using the second operation, which guarantees a high level of security throughout the steps implementing the first operation.

In one possible embodiment, the first value results from a first recombination in accordance with the Chinese Remainders Theorem involving the first variable and the second value results from a second recombination in accordance with the Chinese Remainders Theorem involving the second variable.

The invention also proposes a device for processing data enabling a first operation on an element by means of an operand, including means for updating by a second operation either a first variable or a second variable, depending on whether a corresponding bit of the operand has the value 0 or 1, characterized by means for testing a relationship between the first and second variables.

A device of this kind is included in a microcircuit card, for example.

BRIEF DESCRIPTION OF THE DRAWING FIGURES

Other features and advantages of the invention will become apparent in the light of the following description, given with reference to the appended drawings, in which.

DETAILED DESCRIPTION OF THE INVENTION

Figure 1:
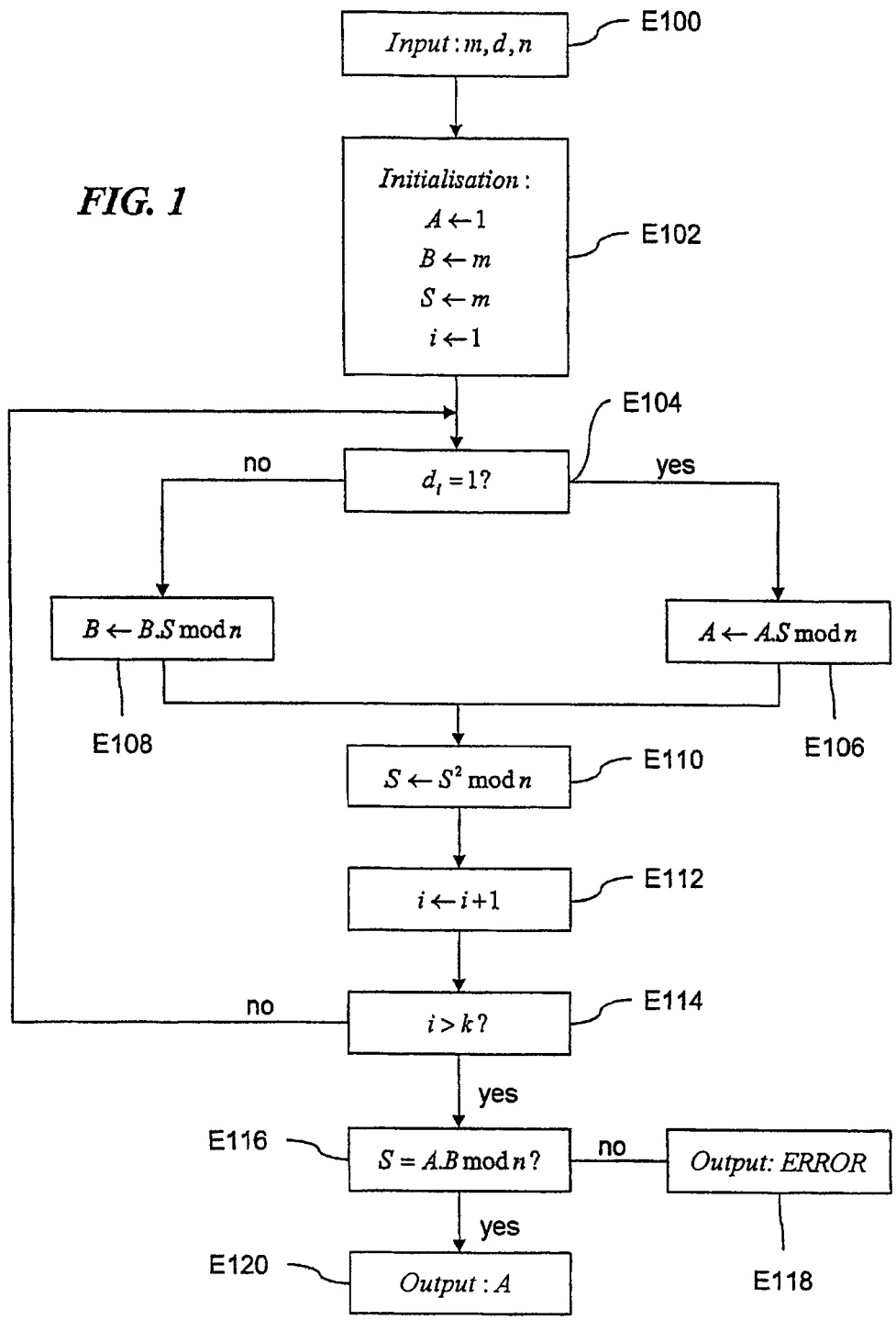
FIG. 1 represents a first embodiment of a data processing method in accordance with the invention.

FIG. 1 represents one example of a method for modular exponentiation calculation conforming to the teachings of the invention. The example given here is described in the form of a subroutine that receives input values and outputs the result of the modular exponentiation calculation. It is nevertheless clear that the invention is not limited to these subroutines.

The step E100 in FIG. 1 corresponds to the reception at the input of the values m, d and n as a function of which the modular exponentiation is to be effected, to obtain the number $m^d$ mod n.

Hereinafter, the number d will be expressed in the form of its binary decomposition $(d_k, \ldots, d_1)$, where k is the number of bits constituting the number d, where each $d_i$ constitutes a bit of the corresponding number with in particular $d_1$ being the least significant bit and $d_k$ being the most significant bit.

Thus $d = S \, d_i \cdot 2^{i-1}$.

In cryptographic algorithms, this kind of modular exponentiation calculation is generally used with the number m representing a message, the number d representing the secret key, and the number n representing the public module. Thus in this context the aim is to protect in particular the determination of the number d (that is to say its binary components $d_i$) by observation of the implementation of the method in an electronic entity or by generating errors in that process.

The process shown in FIG. 1 begins, strictly speaking, with the step E102 of initializing the registers used in this subroutine, namely the initialization to the value 1 of a variable A, the initialization to the value m of a variable B and a variable S, and the initialization to the value 1 of a variable i serving as an index.

Next is the step E104 (which constitutes the first step of a loop as explained hereinafter) in which a test is effected to determine if the bit $d_i$ (that is to say the bit of rank i in the number d) has the value 1.

If so, there follows the step E106 in which the value A·S mod n is calculated, after which the result of this calculation is stored in the variable A (here overwriting the value previously stored in this variable).

In other words, the variable A is updated by means of a modular multiplication by the variable S which, because of the step E110 described hereinafter, has the value $m^{2^i}$ at the time of this update, regardless of the iteration i concerned in the loop.

If the result of the test of the step E104 is negative (that is to say if the bit $d_i$ has the value zero), there follows the step E108 of calculating B·S mod n, after which the variable B is updated with the result of this calculation.

Thus, depending on the value of the bit $d_i$, either the variable A or the variable B is updated by modular multiplication by the variable S.

Regardless of the result of the test of the step E104, the process continues (after the step E106 or the step E108) to the step E110, in which $S^2$ mod n is calculated, after which the result of this calculation is stored in the variable S (overwriting the value previously stored in this variable).

Next the value of the index i is incremented in the step E112, after which the new value of the index i is tested in the step E114: if i is strictly greater than k, there follows the step E116 described hereinafter, whereas if not (that is to say as long as i is less than or equal to k) the step E114 is followed by the step E104 described above (which effects the loop previously mentioned).

If i is strictly greater than k after incrementation, that is to say if all of the bits of the number d have been processed, there follows the step E116 in which the validity of the following relationship is tested: S=A·B mod n.

In normal operation, because of the complementary updating of the variables A and B and the systematic updating of the variable S as described above, the relationship S=A·B mod n is verified.

Consequently, if the result of the test of the step E116 is positive, it is considered that normal operation (that is to say error-free operation) has occurred and there follows the step E120 which returns the output value A which, because it is updated by modular multiplication for only the bits of d having the value 1, itself has the value $m^d$ mod n.

On the other hand, if the result of the test of the step E116 is negative, it is considered that an error has occurred during the processing described, and there consequently follows the step E118 which returns an error value.

In the context of cryptographic algorithms, such error detection is considered to be the consequence of an error generation attack aiming to determine the secret key d. Thus no information liable to assist the attacker in seeking to discover the secret key is returned, of course. On the other hand, protection measures can then be triggered, for example blocking the electronic entity implementing the process (which entity is a microcircuit card, for example).

Note that here the test uses variables that are necessary for performing the symmetrical calculation of the modular exponentiation; this embodiment therefore enables the test step to be carried out without necessitating the use of other variables.

Note also that the relationship tested does not involve the secret key d and does not necessitate a knowledge of the public key (that is to say a knowledge of the number e such that d·e=1 mod(p−1)(q−1)).

Moreover, the relationship involves the two variables A and B modified alternately during the modular exponentiation calculation process so that the modification of either of these two variables, for example by means of an error generation attack, is reflected in non-verification of the relationship. This effectively combats "safe error" attacks that seek to detect the absence of consequences of an error in order to deduce from this that the operation concerned is not actually used by the calculation.

Alternatively, the test of the step E116 could be carried out on each iteration of the loop (that is to say a similar test step could be inserted between the steps E110 and E112, for example), since in normal operation the relationship is verified on each iteration.

In this case, any detection of an error (through non-verification of the relationship) cold be interpreted as the result of an error generation attack; it is therefore preferable in this case for non-verification of the relationship to terminate the modular exponentiation calculation, whereas its verification leads to the iterations continuing normally.

Whichever variant is used (verification at the end of the calculation as in FIG. 1 or on each iteration as just described), note that, as clearly seen in FIG. 1, the number of steps executed and the type of operations effected during those steps do not vary as a function of the secret key d, which renders the process secure against SPA type attacks by measurement of current.

Figure 2:
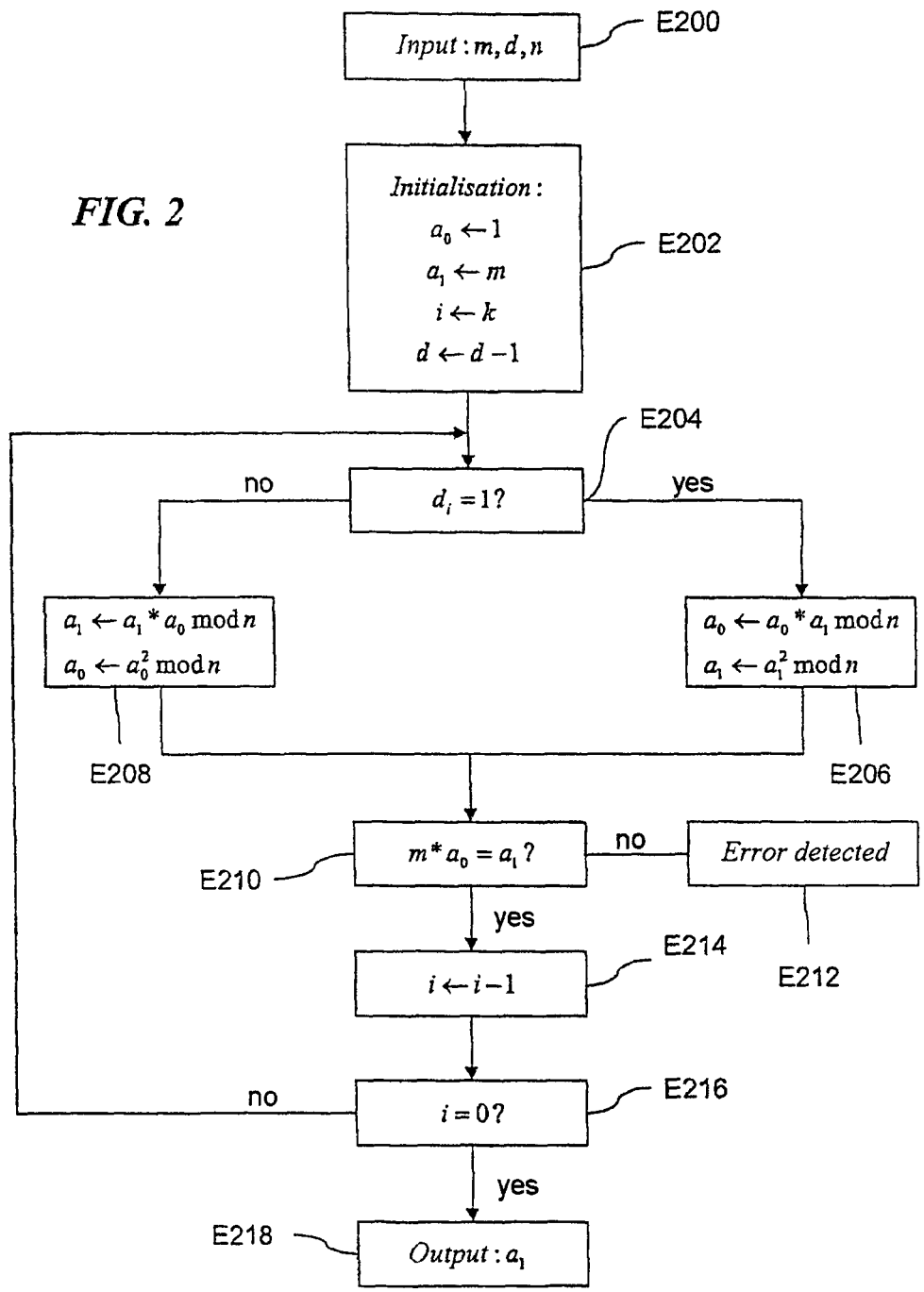
FIG. 2 represents a second embodiment of a data processing method in accordance with the invention.

FIG. 2 represents a second embodiment of the invention.

As for the first embodiment, the entry step E200 denotes the reception by the subroutine described here of the values m, d and n. As before, this is naturally merely one possible example of the use of the invention.

Considering the above values, there follows an initialization step E202 during which a variable $a_0$ is initialized to 1, a variable $a_1$ to m and a variable i to the value k that as before represents the number of bits of the secret key d (k is a fixed datum of the cryptographic system used). Also, d is decremented by one unit because of the way in which the modular exponentiation calculation is effected here.

The process then enters a loop for the modular exponentiation calculation as such, beginning with a step E204 to test the value of the bit $d_i$. (The notation relating to the decomposition of the key d into bits is identical to that explained in relation to the first embodiment and therefore is not repeated here.)

If the bit of rank i in the key d has the value 1, there follows the step E206 in which the first operation is the multiplication of the variable $a_0$ by the variable $a_1$ (that is to say the calculation of $a_0*a_1 \mod n$), the result of which is overwritten in the variable $a_0$. The step E206 also includes the calculation of the value $a_1^2$ and the updating of the variable $a_1$ by the result of that calculation.

If it is determined in the step E204 that the bit of rank i of the secret key d has the value zero (that is to say if $d_i=0$), there follows the step E208 during which there is calculated the product of the variable $a_1$, by the variable $a_0$ (that is to say there is calculated $a_1*a_0 \mod n$), the value obtained is overwritten in $a_1$, the modular square of the variable $a_0$ (that is to say the value $a_0^2 \mod n$) is calculated, and the result of this latter operation is overwritten in the variable $a_0$.

Note that the steps E206 and E208 executed if the bit of the secret key d concerned in the iteration i has the value 1 or 0, respectively, are totally symmetrical with respect to the variables $a_0$ and $a_1$, one of these variables being in each case updated by multiplication by the other variable.

Regardless of the result of the test of the step E204, the step E206 or the step E208 is followed by the step E210 in which the following relationship is tested: $m*a_0=a_1$.

In normal operation, that is to say if the operations of the preceding step E206 or E208 have been carried out without error, this relationship should be verified.

Consequently, if the result of the test of the step E210 is positive, it is considered that the calculation was executed without error, and processing therefore continues with the step E214 as described above.

On the other hand, if the test step E210 fails to verify the relationship $m*a_0=a_1$, it is deduced from this that one of the calculations effected in the preceding step E206 or E208 was interfered with, for example by an error generation attack.

This is why, if the test step E210 yields a negative result, there follows a step E212 in which it is considered that an error has been detected and necessitates appropriate processing. As previously stated, this processing can vary depending on the applications.

As already indicated, normal operation leads to the step E214, in which the variable i is decremented. The step E216 then tests if the variable i has reached 0. If not, not all the bits of the secret key d have been processed and the next iteration of the loop follows by going to the step E204 described above. If so, all the bits of the secret key have been processed and the modular exponentiation is therefore finished: the variable $a_1$ corresponds to the required result, that is to say $m^d \mod n$. The value $a_1$ is therefore returned at the output of the subroutine described here in the step E218.

Alternatively, the step E210 can be executed between the steps E216 and E218, instead of or in addition to the step E210 described above. If the step E210 is no longer performed in the loop, but only after the loop (for example between the steps E216 and E218), the test phases of the algorithm are simplified.

A third embodiment of the invention is described next with reference to FIG. 3, and is used in the context of modular exponentiation using the Chinese Remainders Theorem (CRT).

Figure 3:
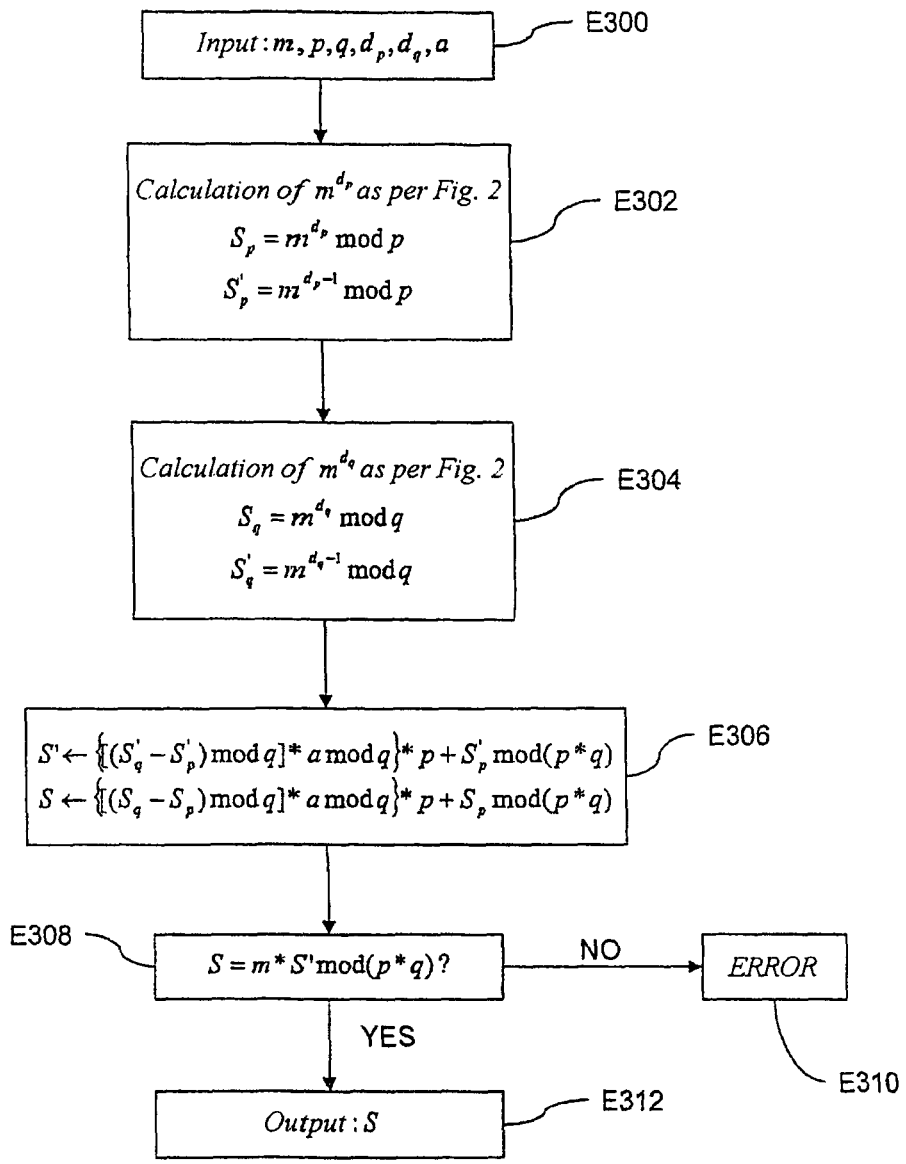
FIG. 3 represents a third embodiment of a data processing method in accordance with the invention.

The algorithm shown in FIG. 3 receives as input the number (or message) m to which the modular exponentiation is to be applied, the two prime numbers p, q constituting the public modulus $n=p \cdot q$, the components $d_p$, $d_q$ of the secret key d relating to p and q (where $d_p=d \mod(p-1)$ and $d_q=d \mod(q-1)$), and the number a such that $a=p^{-1} \mod q$.

There follows in the step E302 partial modular exponentiation of the number m with the exponent $d_p$ using an algorithm of the type described above with reference to FIG. 2. At the end of this algorithm there is therefore obtained a number $S_p$ (corresponding to the number $a_1$ in FIG. 2) that is the result of the partial modular exponentiation (that is to say $S_p=m^{dp} \mod p$) and a number $S'_p$ (corresponding to the number $a_0$ in FIG. 2) such that $S_p=m \cdot S'_p$.

There follows in a similar step E304 partial modular exponentiation by means of the exponent $d_q$ in accordance with an algorithm such as that described with reference to FIG. 2, which yields $S_q=M^{dq} \mod q$ ($S_q$ corresponding to the number $a_1$ in FIG. 2) and S'q (corresponding to $a_0$ in FIG. 2) which in normal operation verifies the relationship $S_q=m \cdot S'q$.

There follows a step E306 of recombining the partial modular results in accordance with the Chinese remainders formula. Thus on the one hand the values $S'_p$ and $S'_q$ are combined to yield the result S' and on the other hand the values $S_p$ and $S_q$ are recombined, which yields the value S.

The results of the partial modular exponentiation being $S_p$ and $S_q$, as explained for the steps E302 and E304, respectively, the variable S contains the modular exponentiation result (that is to say $S=m^d \mod(p*q)$). Moreover, because of the relationships referred to above between $S'_p$ and $S_p$ on the one hand and $S'_q$ and $S_q$ on the other hand, there is also obtained after recombination in normal operation the relationship $S=m*S' \mod(p*q)$.

This is why the accuracy of this relationship is verified in the test step E308.

In the case of a negative verification result in the test step, there follows a step E310 in which it is considered that an error has occurred during the calculation, probably caused by an error generation attack. Appropriate processing can then be applied, as described with reference to the other embodiment.

On the other hand, if the step E308 finds that the relationship $S=m*S' \mod(p*q)$ is verified, it is considered that the algorithm has been executed without error and there follows the step E312 which returns the value S that corresponds, as indicated above, to the modular exponentiation result.

The embodiments that have just been described are merely possible embodiments of the invention. The invention naturally applies in other situations, for example it applies to operations other than modular exponentiation broken down into modular multiplications: thus it applies equally to cryptographic algorithms based on elliptical curves in which multiplications are effected on those curves decomposed as a set of additions.

Furthermore, the invention can be applied to calculation systems other than those described, for example Montgomery arithmetic.

Also, there are different recombination formulas for the CRT method and the invention can be applied to those different formulas.

The invention claimed is:

1. A data processing method, comprising:
    subjecting, with a data processing device, an element to a first operation with a given operand, said first operation including updating by a second operation a first variable if a corresponding bit of the operand has a value 0 and a second variable if the corresponding bit of the operand has a value 1;
    testing, with the data processing device a relationship between a first value derived from the first variable and a second value derived from the second variable; and
    outputting the second value if said relationship is verified, otherwise outputting an error value.

2. The method according to claim 1, wherein the first value is the value of the first variable and the second value is the value of the second variable.

3. The method according to claim 1, wherein the test step is applied to the result of the first operation.

4. The method according to claim 1, wherein the first value results from a first recombination in accordance with the Chinese Remainders Theorem involving the first variable and the second value results from a second recombination in accordance with the Chinese Remainders Theorem involving the second variable.

5. The method according to claim 1, wherein the first operation is a multiplication on an elliptical curve and the second operation is an addition on the elliptical curve.

6. The method according to claim 1, wherein the relationship is independent of the operand.

7. The method according to claim 2, wherein the testing step is applied to the result of the first operation.

8. A data processing method, comprising:
    subjecting, with a data processing device, an element to a modular exponentiation with an exponent, including updating by a modular multiplication a first variable if a corresponding bit of an exponent has a value 0 and a second variable if the corresponding bit of the exponent has a value 1; and
    testing, with the data processing device a relationship between a first value derived from the first variable and a second value derived from the second variable.

9. The method according to claim 8, wherein the test step includes comparing the product of the first variable and the second variable to a third variable updated by calculating a square regardless of the corresponding bit of the operand.

10. The method according to claim 8, wherein the testing step includes comparing the second variable to the product of the element and the first variable.

11. A device for processing data enabling a first operation on an element by means of an operand, comprising:
    means for subjecting an element to a first operation with a given operand, said first operation including updating by a second operation of a first variable if a corresponding bit of the operand has a value 0 and a second variable if the corresponding bit of the operand has a value 1;
    means for testing a relationship between a first value derived from the first variable and a second value derived from the second variable; and
    means for outputting the second value if said relationship is verified, otherwise outputting an error value.

12. The device according to claim 11, wherein the first value is the value of the first variable and the second value is the value of the second variable.

13. The device according to claim 11, wherein the means for testing are applied to the result of the first operation.

14. The device according to claim 11, further comprising means for obtaining the first value as the result of a first recombination in accordance with the Chinese Remainders Theorem involving the first variable and means for obtaining the second value as the result of a second recombination in accordance with the Chinese Remainders Theorem involving the second variable.

15. The device according to claim 11, wherein the first operation is a modular exponentiation, the second operation is a modular multiplication, and the operand is an exponent.

16. The device according to claim 15, wherein the means for testing include means for comparing the product of the first variable and the second variable to a third variable updated by calculating a square regardless of the corresponding bit of the operand.

17. The device according to claim 15, wherein the means for testing include means for comparing the first variable to the product of the element and the second variable.

18. The device according to claim 11, wherein the first operation is a multiplication on an elliptical curve and the second operation is an addition on the elliptical curve.

19. The device according to claim 11, wherein the relationship is independent of the operand.

20. A microcircuit card comprising a device according to claim 11.

* * * * *

UNITED STATES PATENT AND TRADEMARK OFFICE
CERTIFICATE OF CORRECTION

PATENT NO.       : 8,682,951 B2                                          Page 1 of 1
APPLICATION NO. : 11/887632
DATED            : March 25, 2014
INVENTOR(S)      : Boscher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1053 days.

Signed and Sealed this

Twenty-ninth Day of September, 2015

Michelle K. Lee
*Director of the United States Patent and Trademark Office*